Figure 1:
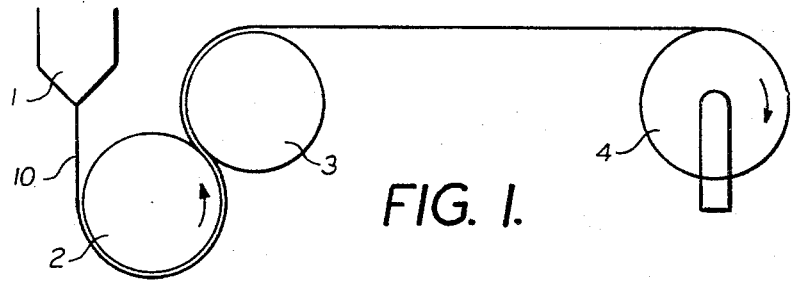

Jan. 2, 1968  A. COEN ET AL  3,361,728
FILMS OF IMPROVED CHARACTERISTICS FROM ALPHA-OLEFIN
POLYMERS AND PROCESS FOR PREPARING THEM
Filed May 27, 1963

INVENTORS
ALBERTO COEN
FLORIANA BERTINOTTI
FRANCESCO SEBASTIANO

BY Maurice B. Stiefel

ATTORNEY

United States Patent Office 3,361,728
Patented Jan. 2, 1968

3,361,728
FILMS OF IMPROVED CHARACTERISTICS FROM ALPHA-OLEFIN POLYMERS AND PROCESS FOR PREPARING THEM
Alberto Coen, Floriana Bertinotti, and Francesco Sebastiano, Terni, Italy, assignors to Montecatini Edison S.p.A., Milan, Italy
No Drawing. Filed May 27, 1963, Ser. No. 283,618
Claims priority, application Italy, May 28, 1962, 10,592/62
9 Claims. (Cl. 260—93.7)

The present invention relates to a method for preparing unstretched films with good mechanical and optical characteristics from polypropylene consisting essentially of isotactic macromolecules.

It is known in the art that films having high mechanical characteristics can be obtained from said polypropylene. It is furthermore known that the essential condition for obtaining transparent and brilliant films is to extrude the polymer at a high temperature and subject the extruded film to a very drastic quenching in a liquid bath or on a cooled roll, thereby obtaining films which have low slip and have high coefficients of first friction. If the film is prepared by extrusion at not too high a temperature and with a not too effective quenching step, it is scarcely transparent and not very brilliant. When the cooling is not sufficiently drastic, crystalline aggregates of remarkable size are formed which are responsible for the poor optical properties.

On the other hand, if the film is quickly cooled, the crystallization nuclei are very numerous and do not have any time for growing. The crystalline aggregates present the film, therefore are very small and cannot interfere with the wave lengths of light.

We have now surprisingly found that by subjecting unstretched films obtained by the extrusion of polypropylene consisting essentially of isotactic macromolecules to a thermal treatment under free or hindered shrinking conditions, there can be obtained manufactured articles having almost unaltered optical properties and improved slip. In accordance with common usage in the art the term "unstretched films" as used herein means films which have not been subjected to stretching after the formation thereof and is not meant to exclude films which have been formed by stretching or extrusion of the polymer. By this treatment the crystallinity of the film is remarkably increased from about 25–30% to a value of 50–60% without, however, altering the optical properties of the article. The optical properties remain unaltered because the very numerous crystallization nuclei present before the thermal treatment scarcely grow during the treatment and therefore the crystalline aggregates obtained at the end remain so small that they do not interfere with the passage of light waves through the film.

It should be noted that a film having a crystallinity of 50–60% obtained directly by extrusion would be very dull since it would consist of a few large crystalline aggregates and not of the many small crystalline aggregates which occur in films obtained by the thermal treatment of transparent film.

The crystalline aggregates of the thermally treated films, in spite of their small size, are sufficient to cause a decrease in coefficient of friction and consequently increased slip. The process of the present invention more particularly consists of subjecting films, after extrusion, to a quenching at a temperature of between 0° and 20° C. and to a thermal treatment, under conditions which either allow or prevent shrinking, at a temperature of 60–150° C. for times varying from some fractions of a second to 60 minutes.

Figure 2:
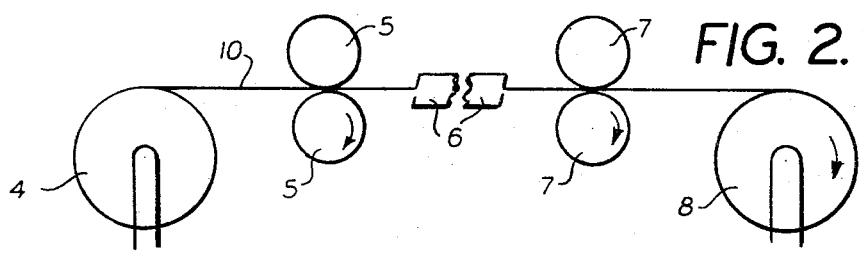

In the drawings:
FIG. 1 is a longitudinal sectional view of extrusion apparatus which may be employed in preparing the polypropylene film to be employed in the present invention;
FIG. 2 is a longitudinal sectional view of apparatus which may be employed to treat the polypropylene film in accordance with the present invention; and
FIG. 3 is a flow sheet showing the sequential steps which are performed in preparing the improved film of the present invention.

Referring to the drawings in detail, FIG. 1 illustrates a polypropylene film 10 being drawn from extruder 1, passed around a cooling roller 2, over a guide roller 3 and on to a take-up roller 4. As mentioned hereinabove, the only stretching which occurs prior to the treatment in accordance with the present invention is during the extraction of the polypropylene from the extruder to form the polypropylene film. This extruded film is considered an "unstretched film" for the purposes of the present specification and claims. More precisely, it is "non-stretched subsequent to its formation."

In the apparatus of FIG. 2, the polypropylene film 10 is unwound from the roller 4 and passes between a first pair of guide rollers 5, through a heating zone 6 wherein the thermal treatment of the present invention is effected, and then between a second pair of guide rollers 7 and on to a second take-up roller 8.

Figure 3:
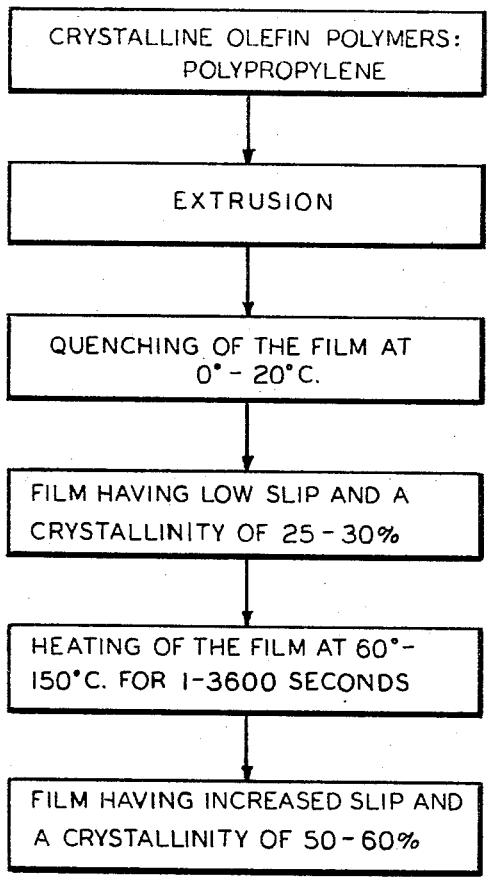

The flow sheet of FIG. 3 is believed to be self-explanatory and is provided merely to summarize the operations which are performed on the apparatus of FIGS. 1 and 2, and the results thereof.

The method of the present invention is particularly suitable for improving the characteristics of polypropylene films. The propylene polymers used for the preparation of the films can be stabilized, before extrusion, with products known in the art. In the examples, the coefficient of friction has been evaluated according to the Polymer Method, described in the paper, "Coefficient of Friction and Workability on Automatic Machines of Films of Plastic Materials," presented by Dr. F. Protospataro at the XIII Plastics Meeting, Turin (Italy), September 1961. Various modifications and variations can be made in the details of the invention without departing from the spirit and the scope of the invention.

The following examples illustrate the invention without limiting its scope.

*Example 1*

A polypropylene having an intrinsic viscosity [$\eta$] of 1.7, an ash content of 0.010–0.015% and a residue, after heptane extraction, of 95% is extruded in an extruder in which the maximum temperatures of the screw end and of the head are 260° C. The opening of the extruder slit is 0.2–1 mm. and the film is extruded by stretching it in the plastic phase. The film has a thickness of 25 microns.

The extruded film is quenched by passing it over a roll cooled to 18–20°, placed at a distance of 5–6 cm. from the extruder head. The film thus obtained has the following characteristics:

Haze (ASTM D1003/52) _____percent__ 6
Gloss (ASTM D523–53T) _____do____ 105
Coefficient of friction (polymer method) _____ 1.70
Crystallinity (determined by density=0.8788)
                                        percent__ 35

The film is subjected to a thermal treatment at 60° C. for 60 minutes with a free-shrinking device, i.e., a device which permits the film to shrink during the thermal treatment. (As is well known in the art, such films tend to shrink upon heating.)

The film, after the thermal treatment, has the following characteristics:

Haze (ASTM D1003/52) _____percent__ 6
Gloss (ASTM D523–53T) _____do____ 105
Coefficient of friction (polymer method) _____ 1.30
Crystallinity (density=0.8805) _____percent__ 38

*Example 2*

A polypropylene having an intrinsic viscosity [η] of 1.7, an ash content of 0.010–015% and a residue, after heptane extraction, of 95–96% is extruded in an extruder in which the maximum temperatures of the screw end and of the extruder head reach 280° C.

The opening of the extruder slit is 0.2–1.0 mm. and the film is extruded by stretching it in the plastic phase. The film has a thickness of 25 microns.

The extruded film is quenched by passing it over a roll cooled to 18–20° C., placed at a distance of 5–6 cm. from the extruder head.

The film thus obtained has the following characteristics:

Haze (ASTM D1003/52) _____percent__ 3
Gloss (ASTM D523–53T) _____do____ 153
Coefficient of friction (polymer method) _____ 3.85
Crystallinity (determined by density 0.8788)
　　　　　　　　　　　　　　　　　　percent__ 35

The film is subjected to a thermal treatment consisting of keeping the film, under free shrinking conditions, in an oven at 120° C. for 5 minutes.

The film, after thermal treatment, has the following characteristics:

Haze (ASTM D1003/52) _____percent__ 3
Gloss (ASTM D523–53T) _____do____ 135
Coefficient of friction (polymer method) _____ 2.05
Crystallinity (determined by density 0.8890)
　　　　　　　　　　　　　　　　　　percent__ 48

*Example 3*

A polypropylene having an intrinsic viscosity [η] of 1.7, an ash content of 0.010–0.015% and a residue, after heptane extraction, of 95–96% is extruded in an extruder in which the maximum temperatures of the screw end and of the extruder head reach 260° and 250° C., respectively.

The opening of the extruder slit is 0.2–1 mm. and the film is extruded by stretching it in the plastic phase. The film has a thickness of 25 microns.

The extruded film is quenched by passing it over a roll cooled to 18–20° C., placed at a distance of 5–6 cm. from the extruder head.

The film thus obtained has the following characteristics:

Haze (ASTM D1003/52) _____percent__ 6
Gloss (ASTM D523–53T) _____do____ 105
Coefficient of friction (polymer method) _____ 1.70
Crystallinity (determined by density 0.8788)
　　　　　　　　　　　　　　　　　　percent__ 35

The film is subjected to a thermal treatment at 140° C. for 5 minutes under free shrinking conditions.

The film, after the thermal treatment, has the following characteristics:

Haze (ASTM D1003/52) _____percent__ 6
Gloss (ASTM D523–53T) _____do____ 105
Coefficient of friction (polymer method) _____ 0.95
Crystallinity (determined by density 0.8960)
　　　　　　　　　　　　　　　　　　percent__ 56

*Example 4*

A polypropylene having an intrinsic viscosity [η] of 1.7, an ash content of 0.010–0.015% and a residue, after heptane extraction, of 95–96% is extruded in an extruder in which the maximum temperatures of the screw end and of the extruder head reach 260° and 250°, respectively.

The opening of the etxruder slit is 0.2–1 mm. and the film is extruded in the plastic phase. It has a thickness of 25.1 microns. The extruded film is quenched by passing it over a roll cooled to 12–20° C., placed at a distance of 5–6 cm. from the extruder head.

The film, thus obtained, has the following characteristics:

Haze (ASTM D1003/52) _____percent__ 6
Gloss (ASTM D523–53T) _____do____ 105
Coefficient of friction (polymer method) _____ 1.70
Crystallinity (determined by density 0.8788)
　　　　　　　　　　　　　　　　　　percent__ 35

The film is subjected to a thermal treatment with a heating device at 150° C. for 5 minutes under free shrinking conditions. The film, after the thermal treatment, has the following characteristics:

Haze (ASTM D1003/52) _____percent__ 6
Gloss (ASTM D523–53T) _____do____ 105
Coefficient of friction (polymer method) _____ 0.92
Crystallinity (determined by density 0.8990)
　　　　　　　　　　　　　　　　　　percent__ 59

*Example 5*

A film similar to that described in Example 1 is subjected to a thermal treatment consisting of heating the sample at 140° C. for 5 minutes under free shrinking conditions.

The film, after the thermal treatment, has the following characteristics:

Haze (ASTM D1003/52) _____percent__ 6
Gloss (ASTM D523053T) _____do____ 135
Coefficient of friction (polymer method) _____ 1.36
Crystallinity (determined by density 0.8960)
　　　　　　　　　　　　　　　　　　percent__ 56

What is claimed is:

1. A process for preparing a film from polypropylene consisting essentially of isotactic macromolecules, said film having a maximum haze of about 6% and a crystallinity of about 50 to 60% and being comprised of small crystals, which process comprises heating a preformed, transparent polypropylene film, non-stretched subsequent to its formation, having a crystallinity of about 30% and a good gloss, at a temperature between 60° and 150° C. for a time between 1 second and 60 minutes, without subjecting the film to stretching during this heat treatment, whereby the slip of the film is increased markedly without substantially decreasing the gloss or transparency of the film.

2. The process of claim 1 in which the film is maintained under free shrinking conditions during the heating.

3. The process of claim 1 in which the film is maintained under hindered shrinking conditions during the heating.

4. The process of claim 1 in which said film is heated for at least about 5 minutes.

5. The process of claim 1 in which the preformed polypropylene film is obtained by extrusion of the molten polymer followed by quenching of the film at temperatures between 0° and 20° C.

6. The process of claim 5 in which the film is maintained under free shrinking conditions during the heating.

7. The process of claim 5 in which the film is maintained under hindered shrinking conditions during the heating.

8. The process of claim 5 in which said film is heated for at least about 5 minutes.

9. A film of polypropylene consisting essentially of isotactic macromolecules and having a maximum haze of about 6% and a low coefficient of friction, said film having a crystallinity of about 50 to 60% and being comprised of small crystals, said film having been produced by the process of claim 1.

(References on following page)

References Cited

UNITED STATES PATENTS

| | | | |
|---|---|---|---|
| 2,431,042 | 11/1947 | Ingersoll | 260—216 |
| 2,936,492 | 5/1960 | Sewerlick | 264—216 |
| 3,054,652 | 9/1962 | Heumann | 264—28 |
| 3,115,744 | 12/1963 | Nott | 264—342 |

FOREIGN PATENTS

| | | |
|---|---|---|
| 108,242 | 9/1958 | Pakistan. |
| 221,446 | 9/1957 | Australia. |

OTHER REFERENCES

Raff, Allison: Polyethylene (1956), p. 267.

JOSEPH L. SCHOFER, *Primary Examiner.*

R. F. WHITE, *Examiner.*

LAWRENCE EDELMAN, R. B. MOFFITT, *Assistant Examiners.*